Sept. 5, 1944.  M. B. MORGAN  2,357,343
DIFFERENTIAL WHEEL ASSEMBLY
Filed Dec. 8, 1941  2 Sheets-Sheet 1

Inventor
Mathew B. Morgan

By Strauch & Hoffman
Attorneys

Sept. 5, 1944.   M. B. MORGAN   2,357,343
DIFFERENTIAL WHEEL ASSEMBLY
Filed Dec. 8, 1941   2 Sheets-Sheet 2

Inventor
Mathew B. Morgan
Strauch & Hoffman
Attorneys

Patented Sept. 5, 1944

2,357,343

UNITED STATES PATENT OFFICE 2,357,343

DIFFERENTIAL WHEEL ASSEMBLY

Mathew B. Morgan, Detroit, Mich., assignor to The Timken-Detroit Axle Company, Detroit, Mich., a corporation of Ohio Application December 8, 1941, Serial No. 422,176

10 Claims. (Cl. 180—22)

My invention relates to dual wheel assemblies for vehicles and is particularly concerned with differential and braking arrangements for such dual wheel assemblies.

It is a major object of the invention to provide a dual wheel assembly wherein the wheels are relatively rotatable and interconnected by novel differential mechanism, and having braking arrangements providing efficient braking action on both wheels under all conditions of operation. The invention is applicable to drive or trailer axles.

A further object of the invention is to provide a dual wheel assembly wherein the wheels are relatively rotatable and interconnected in a novel manner by special differential mechanism disposed inwardly of the inner wheel.

A further object of the invention is to provide a dual wheel assembly for drive axles wherein the wheels are relatively rotatable and differentially interconnected, and braking mechanism is applied directly and solely to only one wheel, the arrangements being such that the other wheel is uniformly braked through the differential. Preferably the inner wheel is directly braked.

It is a further object of the invention to provide a dual wheel assembly for a full floating drive axle wherein the wheels are relatively rotatable and interconnected by novel differential arrangements in the drive axle.

A further object of the invention is to provide a dual wheel assembly for a trailer axle wherein the wheels are relatively rotatable and differentially interconnected, and novel braking arrangements effective on the differential carrier are provided inwardly of the assembly.

A further object of the invention is to provide a dual wheel assembly for supporting one end of an axle wherein the wheels are relatively rotatable, and a special bevel gear differential is located inwardly of the assembly with its side gears independently secured to the wheels.

A further object of the invention is to provide a trailer axle assembly supported at opposite ends by differentially rotatable dual wheel assemblies and provided with special novel braking arrangements carried by the axle intermediate said dual wheel assemblies.

Further objects of the invention will appear as the description proceeds in connection with the appended claims and the annexed drawings in which:

Figure 1:
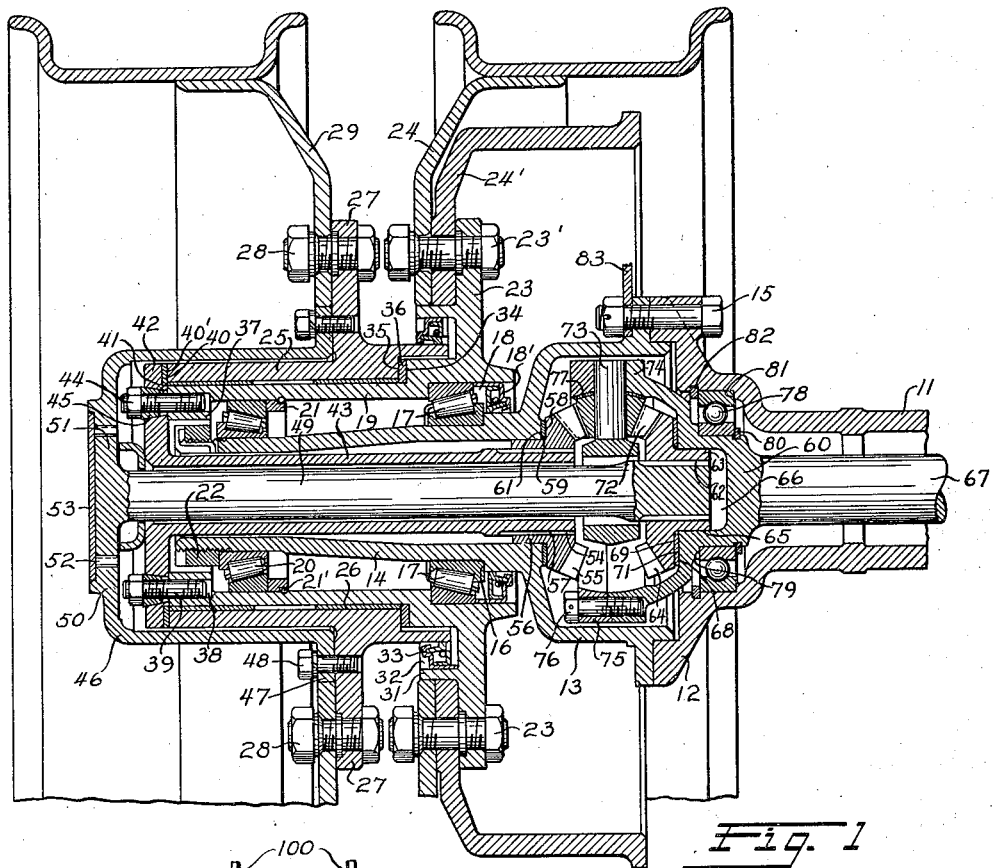
Figure 1 is an elevation partly in section illustrating a preferred embodiment of my invention as applied to a dual wheel assembly at one end of a full floating drive axle.
Figure 3:
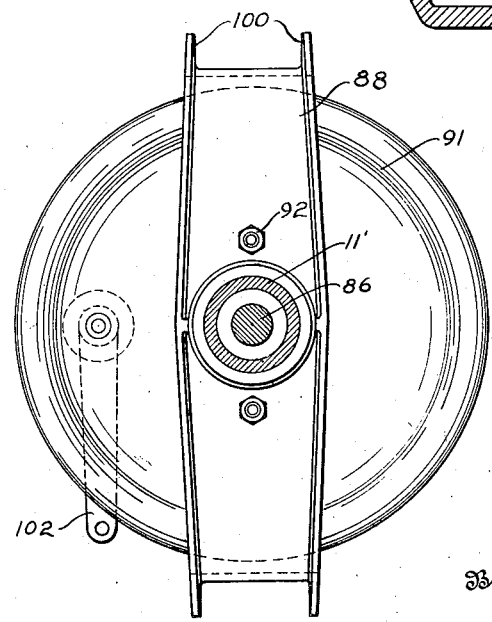
Figure 3 is an end elevation partly in section of the brake mechanism and its support on the trailer axle assembly of Figure 2.

Referring to Figure 1, a non-rotatable axle housing 11 is enlarged at each outer end as at 12 to form one side of a differential housing, the other side of the differential housing comprising a correspondingly enlarged inner end portion 13 of a tubular wheel supporting member 14 rigidly and non-rotatably secured to enlarged end 12 of the axle housing as by bolts 15. The differential housing and member 14 comprises a rigid extension of axle housing 11.

A dual wheel assembly is journalled on each member 14 to support opposite ends of the axle.

Outwardly of the differential housing, member 14 is formed with an outwardly facing lateral shoulder 16 against which is seated the inner race of an annular anti-friction bearing assembly 17 carried by member 14. The outer race of bearing assembly 17 is seated against the inwardly facing bottom of an internal shouldered recess 18 of an inner wheel hub member 19 surrounding and substantially concentric with member 14.

A second annular anti-friction bearing assembly 20 is mounted on member 14 near its outer end. An annular retainer 21, anchored against inward displacement by a spring ring and groove arrangement at 21', provides a lateral seat for the outer race of bearing assembly 20, while the inner race of bearing assembly 20 is engaged by a suitable lock nut assembly 22 on the threaded outer end of member 14.

Nut 22, when tight, rigidly secures the bearing assemblies in spaced relation between the hub 19 and member 14 so that hub 19 is journalled on member 14, and prevents relative axial displacement of hub 19 and member 14. A grease tight seal 18' carried by hub 19 in recess 18 closes the annular space between the inner ends of hub 19 and member 14.

Adjacent its inner end, hub member 19 is formed with an integral and continuous external annular flange 23 to which are directly secured, as by bolt and nut assemblies 23', the web of inner wheel 24 of the dual wheel assembly and a brake drum 24' of conventional shape and size. An outer wheel hub member 25 is rotatably mounted on inner wheel hub member 19, the inner and outer hub members being separated by a freely rotatable cylindrical collar 26 having relatively smooth inner and outer surfaces engaging the hub members and forming a floating bearing between them. Outer hub member 25 is formed with an integral continuous external annular flange 27 which has secured thereto, as by the bolt and nut assemblies indicated at 28, the web of outer wheel 29 of the dual wheel assembly.

Flange 23 of the inner hub is provided laterally with an outwardly projecting integral annular rib 31 which forms with the body of hub 19 an annular side recess 32 into which projects the inner end of outer hub member 25. A suitable grease seal 33 is secured to rib 31 within recess 32 to close the annular space between rib 31 and the inner end of hub member 25.

Adjacent their inner ends, hub members 19 and 25 are shouldered externally and internally, respectively, to provide opposed lateral faces 34 and 35 contacting opposite sides of a flat annular hardened steel thrust washer 36 freely rotatable with respect to either of the hub members. Washer 36 also provides a thrust support for the inner end of collar 26.

The outer end of inner hub member 19 is formed with a thickened annular section 37 having an annular series of tapped holes 38 for receiving studs 39. Each stud 39 passes through a corresponding tapered aperture 41 in a large annular flange 42 integral with the outer end of a sleeve 43 which extends through outer axle housing member 14. A hardened steel annular washer 40, corresponding to washer 36, is seated in an internal annular shoulder 40' on flange 42 providing a freely rotatable thrust bearing between flange 42 and the outer end face of hub member 25. A plurality of nuts 44, which when tightened urge split tapered washers 45 into apertures 41, rigidly and non-rotatably secure sleeve 43 to inner hub member 19. Sleeve 43 is concentric with the hub members.

A cup-shaped hub cap 46 disposed about the outer end of the hub assembly is provided with an outwardly turned integral annular lip 47 which is non-rotatably secured as by bolts 48 to flange 27 of the outer hub member.

A solid cylindrical shaft 49 projects axially in spaced relation through sleeve 43 and is concentric therewith. End wall 50 of cap 46 is centrally apertured on the axis of shaft 49 and shaft 49 is formed at its outer end with an integral enlarged end flange 51 having its periphery non-rotatably connected, as by splines 52, to wall 50 of hub cap 46. The aperture in wall 50 is closed by a flat plate 53 seated in a correspondingly shaped depression in the outer surface of wall 50.

At its inner end, sleeve 43 projects into the differential housing and has non-rotatably secured thereto, as by spline connection 54, a bevel gear 55 comprising one side gear of a differential assembly within the housing. Hub 56 of gear 55 is suitably rotatably supported on sleeve 43 at 57 where the sleeve enters the differential housing. Opposite its toothed face, gear 55 is formed with a machined lateral face 58 which is seated against one side of an annular hardened steel washer 59 freely rotatably disposed between face 58 and a corresponding opposing lateral face 61 on the differential housing. Shaft 49 extends through the center of the differential spider and is non-rotatably secured as by splined connection 62 to hub 63 of a bevel gear 64 comprising the other side gear of the differential gear assembly. Hub 63 is suitably rotatably supported in axial alignment with gear 55 on a suitable cylindrical bearing face 65 comprising the wall of a cup-shaped recess 66 formed in an enlarged end section 60 of a drive axle shaft 67. Enlarged end section 60 of the axle shaft is formed with a machined lateral bearing face 68 opposite a similar face 69 on the back of gear 64, and an annular hardened steel washer 71 disposed between these faces provides a freely rotatable floating thrust bearing between them.

Side gears 55 and 64 are meshed with bevel pinion 72 freely rotatable on a cylindrical stud 73 rigid with a differential spider, the latter preferably comprising a substantially cup-shaped integral extension 74 of the enlarged inner end of shaft 67 equipped with an annular pinion retaining rim 75 rigidly secured thereto as by bolts 76. Shaft end 74 and rim 75 are formed with opposed recesses for receiving and non-rotatably holding stud 73. A suitable concave-convex annular bearing washer 77 is provided between the back of pinion 72 and the adjacent face of the differential spider.

At the inner side of the differential housing, the outer end of axle shaft 67 is rotatably supported on the stationary axle housing by a large anti-friction bearing assembly 78. The inner race of bearing 78 is seated on a suitable external shoulder 79 on enlarged section 60 of the axle shaft and maintained against axial displacement by a snap ring 80 fitting within an annular groove on shaft section 60. The outer race of bearing 78 is seated against an internal shoulder 81 within housing end 12 and maintained against axial displacement by a snap ring 82 fitting within an annular groove in the interior of the housing.

Bolt assemblies 15, which secure the inner and outer sides of the differential housing together, also non-rotatably secure to the axle housing a rigid web 83 which carries the brake mechanism (not shown) adapted to act upon the interior of brake drum 24'. Since this brake mechanism may be of any conventional expanding shoe type, it is believed that detailed description thereof is unnecessary.

Figure 1 illustrates only one end of the axle and the other end of the axle is of duplicate construction, the parts merely being reversed to suit the location. Intermediate the ends of the axle, housing 11 is formed with the usual differential housing within which axle shafts 67 leading from the opposite dual wheel assembly are interconnected by the usual differential driving mechanism powered by the propeller shaft driven from the engine. Since these usual differential arrangements are of conventional type, and do not comprise part of the present invention, further description thereof is deemed unnecessary.

*Operation*

In the dual wheel assembly of Figure 1, the drive axle elements including axle shaft 67, the differential mechanism within the differential housing, and coaxially disposed shaft 49 and sleeve 43 comprise a full floating axle assembly which serves to directly drive the vehicle wheels.

As shaft 67 is rotated under power from the engine, the differential spider is rotated and power is divided equally and uniformly between sleeve 43 and shaft 49 so that wheels 24 and 29 have substantially the same power applied to them at all times during driving. Since wheels 24 and 29 are mounted for relative rotation and are connected to the opposite side gears of the differential assembly, they are capable of rotating at different relative speeds to compensate for drive conditions where differences in travel are required for each wheel, as when the vehicle is turning a corner or where the road has an appreciable crown, for preventing scuffing or sidewise drag tending to wear the tires. Under these conditions of differential rotation of the dual wheels, shaft 49 and sleeve 43 and the associated side gears simply rotate relative to each other, with the transmitted power always being equally divided between the driven wheels.

Brake drum 24' is attached to and rigid with inner wheel 24, and I have found this arrangement to be very satisfactory in drive axle assemblies, no brake drum being required for the outer wheel.

Braking force applied to drum 24' acts directly on wheel 24 and is transmitted through flange 23, inner hub 19, flange 42, sleeve 43, gear 55, pinion 72, gear 64, shaft 49 and hub cap member 46 to outer wheel 29. As rotation of gear 55 is slowed upon application of the braking force at 24', rotation of gear 64 and outer wheel 29 rigid therewith is correspondingly positively slowed because pinion 72 is meshed with both gears 55 and 64 and driven axle shaft 67 rigid with the differential spider is prevented from possible rotation due to reaction against the braking force by the drive power maintained thereon, the engine compression or the inertia of the vehicle drive system.

Thus the dual wheel assembly for the above-described drive axle insures efficient transmission of the braking force to the outer wheel.

*Trailer axle assembly*

Figure 2:
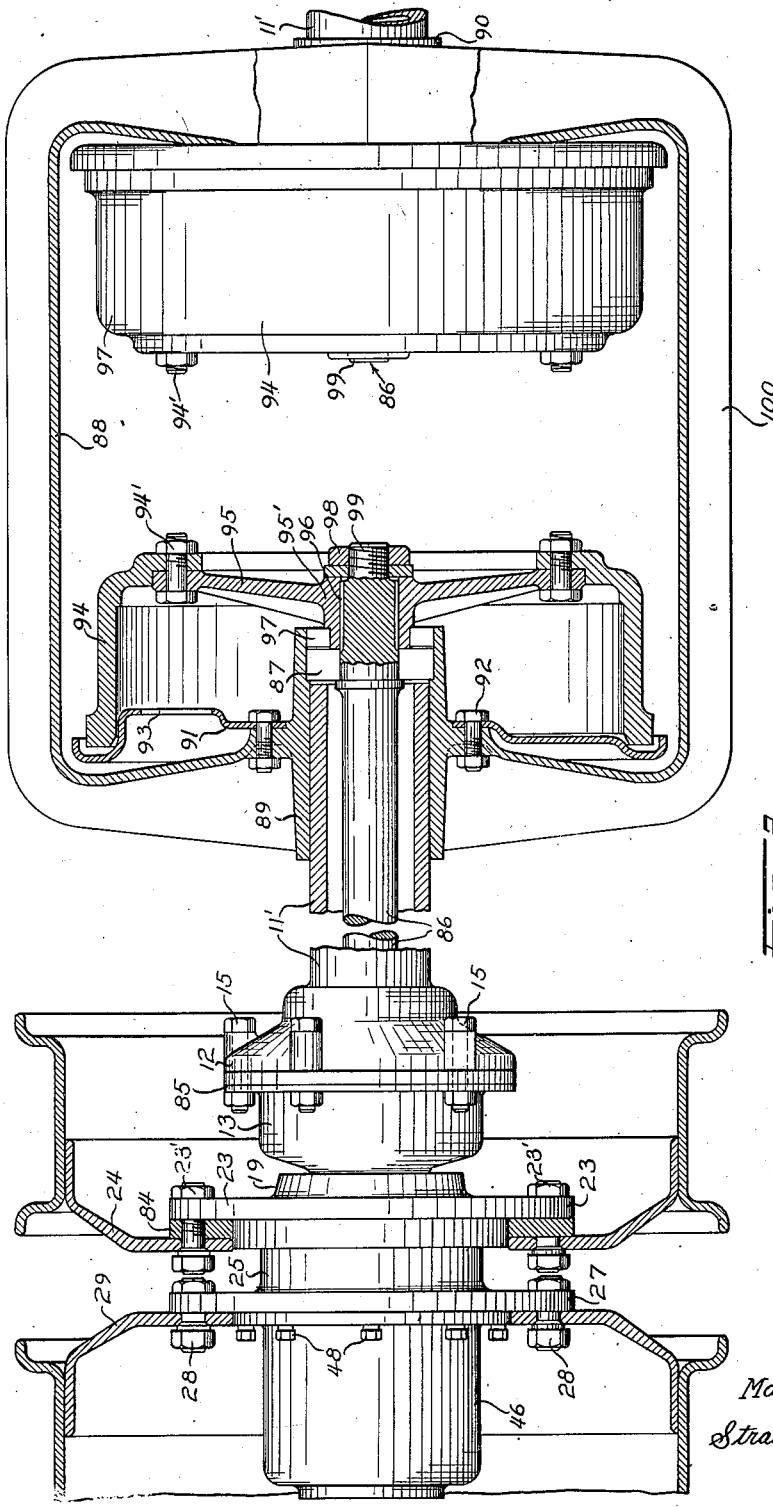
Figure 2 is an elevation partly in section of a further embodiment of the invention illustrating its application to a dual wheel assembly at one end of a trailer or non-driven axle assembly, and further showing the special brake arrangements for this construction.

Figure 2 illustrates the central part and one end of a trailer axle dual wheel assembly embodying the invention. The parts of Figure 2 corresponding to identical parts in Figure 1 are numbered similarly to Figure 1, the chief distinction between the drive and trailer axles being that in the trailer axle there is no brake drum analogous to drum 24' on wheel 24, the web of trailer axle wheel 24 being spaced from flange 23 by an annular member 84 the purpose of which is simply to permit interchangeable use of the same hub member 19 in both the drive and trailer axles.

Similarly, instead of the brake web 83 of Figure 1, the trailer axle is provided with a spacer ring 85 on the differential housing to permit the same axle housing end construction to be interchangeably used in the drive and trailer axles. This simplifies and reduces manufacture and assembly time and costs.

Another main distinction between the structures of Figure 1 and Figure 2 is that, in Figure 2, trailer axle shaft 86, the outer end of which is formed identically with drive axle shaft 67 in Figure 1, is an idle non-driven shaft rotatably supported adjacent its inner end in anti-friction bearing 87 carried by the inner end of housing 11'. Housing 11' is formed identically with housing 11 at its outer end.

Substantially centrally of the trailer axle assembly, an enlarged brake mechanism support 88 is formed with integral centrally located hollow end bosses 89 and 90 in which the inner ends of axle housings 11' leading from the opposite dual wheel assemblies are suitably non-rotatably secured. Brake mechanism support 88 preferably comprises an integral frame, and therefore is a rigid part of the non-rotatable trailer axle housing assembly. Support 88 is longitudinally braced by external ribs 100.

Referring to the left side of support 88 in Figure 2, a stationary web 91 rigidly secured to support 88 as by bolts 92 carries a brake operating mechanism at opening 93 (not shown) adapted to apply an expanding brake shoe mechanism (not shown) to the interior of a brake drum 94. Brake drum 94 is bolted at 94' to a spider 95 formed with a central hub 95' splined at 96 to the inner end of idle shaft 86 beyond bearing 87. A suitable grease retainer ring 97 closes the annular space between hub 95' and the inner end of boss 89. Brake drum 94 is maintained on the end of shaft 86 by a lock washer and nut assembly 98 carried by the reduced threaded end 99 of shaft 86.

Within the right side of brake support 88, another brake drum 97 and brake mechanisms corresponding to that at the left side of the support are arranged at the inner end of the idle trailer axle shaft 86 from the opposite dual wheel assembly. Any suitable brake operator may be provided as indicated at 102.

Thus each dual wheel assembly of the trailer axle is provided with an individual brake. The braking forces directly effective on each idle shaft 86 rigid with its associated differential spider are therefore equally and uniformly divided between associated wheels 24 and 29 because of the above-described differential mechanism connecting each of these wheels with its shaft.

The invention is peculiarly advantageous in that it enables the use of full floating axle arrangement for dual wheel assemblies.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an axle assembly for wheeled vehicles, an axle housing made up of a hollow spindle section and a hollow support section having mating end faces; means for securing said sections together in end-to-end relationship along a plane normal to their axes; said housing having an enlarged diameter bowl portion adjacent the mating faces of said sections; a first wheel hub journalled on said spindle section and terminating at one end closely adjacent said bowl portion in a flange member to which a wheel is adapted to be secured in substantially enclosing relationship to said bowl portion; a flanged second hub, to which a second wheel may be secured, journalled on said first hub for independent coaxial rotation therewith; a sleeve and a stub shaft mounted for coaxial rotation in said spindle section and drivingly connected to said first and second hubs respectively, said stub shaft and sleeve projecting into said bowl portion and carrying differential side gears; a differential carrier mounted for rotation in said bowl portion and having a shaft member projecting into said hollow support section of said housing; miter gears on said carrier meshing with said differential side gears; and brake means for applying a braking action directly to one of said members.

2. The axle construction defined in claim 1, wherein said brake means comprises a brake drum mounted on the flange member of said first hub and a brake foundation structure mounted on said housing.

3. The axle construction defined in claim 1, wherein said support section of said housing comprises a second bowl portion containing a differential mechanism to which said shaft member is drivingly connected, and said brake means comprises a brake drum secured to the flange member of said first hub.

4. The axle construction defined in claim 1, wherein said brake means comprises a brake drum secured to the flange member of said first hub and a brake foundation plate rigidly secured to said housing adjacent the mating faces of said spindle and support sections.

5. The axle construction defined in claim 1, wherein said brake means comprises a brake drum mounted on said shaft member and a brake foundation structure mounted on said support section of said housing.

6. The axle construction defined in claim 1, wherein said brake means comprises a brake drum mounted on the end of said shaft member remote from said carrier, and a brake foundation plate mounted on said support section of said housing, together with an annular spacer on the flange member of said first hub, between the latter and said wheel, and having a thickness substantially equal to that of the web of said brake drum.

7. The axle construction defined in claim 1, wherein the side gears on said sleeve and stub shaft are journalled in the spindle section of said housing and said differential carrier respectively, and the latter is journalled in the support section of said housing.

8. In a trailer axle, an axle housing made up of a hollow spindle section and a hollow support section having mating end faces; means for securing said sections together in aligned relationship with their mating faces disposed in a plane substantially normal to their axes, said housing having an enlarged bowl portion adjacent the junction of said spindle and support sections; a first hub journalled on said spindle and having a flange closely adjacent said bowl portion; a wheel secured to said flange and partially enclosing said bowl portion of said housing; a flanged second hub journalled on said first hub; a second wheel secured to the flange of said second hub; a sleeve and a stub shaft mounted for independent coaxial rotation in said spindle section and drivingly connected to said first and second hubs respectively, said sleeve and stub shaft projecting into said bowl portion of said housing and carrying differential side gears; a differential carrier journalled in said bowl portion and having a shaft portion extending into said support section; miter gears on said carrier meshing with said side gears; and brake means for applying a braking action directly to the shaft portion of said carrier.

9. The axle construction defined in claim 8, wherein said bowl portion comprises a deep portion of enlarged diameter on one of said housing sections and a shallow portion of enlarged diameter on the other of said housing sections and said mating faces are located at the periphery of said deep and shallow sections.

10. The axle construction defined in claim 8, wherein said bowl portion of said housing comprises flared portions on the neighboring ends of said spindle and support sections, and the side gears on said sleeve and shaft are journalled in said spindle and said differential carrier respectively, and the latter is journalled in the support section of said housing.

MATHEW B. MORGAN.